United States Patent [19]
Harlamoff et al.

[11] Patent Number: 5,406,409
[45] Date of Patent: Apr. 11, 1995

[54] NARROW LINEWIDTH BBO OPTICAL PARAMETRIC OSCILLATOR UTILIZING EXTRAORDINARY RESONANCE

[75] Inventors: Brian L. Harlamoff, Soquel; James J. Jacob, Aptos, both of Calif.

[73] Assignee: Hoya Corporation, Tokyo, Japan

[21] Appl. No.: 220,117

[22] Filed: Mar. 30, 1994

[51] Int. Cl.$^6$ .............................................. G02F 1/39
[52] U.S. Cl. ...................................... 359/330; 372/21
[58] Field of Search .................... 385/122; 372/21, 22; 359/326–332

[56] References Cited

U.S. PATENT DOCUMENTS

| | | | |
|---|---|---|---|
| 3,670,258 | 6/1972 | Magnante | 359/328 |
| 4,784,450 | 11/1988 | Jain et al. | 359/332 |
| 5,134,622 | 7/1992 | Deacon | 372/21 |
| 5,333,142 | 7/1994 | Scheps | 372/22 |

OTHER PUBLICATIONS

Brosnan, Stephen J. and Robert L. Byer; "Optical Parametric Oscillator Threshold and Linewidth Studies"; *IEEE Journal of Quantum Electronics;* vol. QE–15, No. 6; Jun. 1979; pp. 415 14 431.

*Primary Examiner*—John D. Lee
*Attorney, Agent, or Firm*—Majestic, Parsons, Siebert & Hsue

[57] ABSTRACT

Optical parametric oscillators using non-linear crystals cut for the type I interaction have an extraordinary pump beam which generates ordinary signal and idler beams. The use of an optical element to rotate the signal beam before sending this signal beam to a grating element allows for the grating element to have its dispersion plane oriented coplanar with the extraordinary crystal plane of the non-linear crystal. In this manner, for non-linear crystals which have relatively narrow acceptance angles, such as BBO crystals, the reduction in angular aperture of the parametric gain in the extraordinary plane will produce a reduction in the linewidth of the produced output. The grating translates the angular variations into variations in wavelength. If no rotator was used in the optical parametric oscillator, then in order to get the maximum efficiency out of the grating, the dispersion plane of the grating should be orthogonal to the extraordinary plane of the crystal, and therefore the narrow angular acceptance of the crystal would not result in a narrow output linewidth.

32 Claims, 4 Drawing Sheets

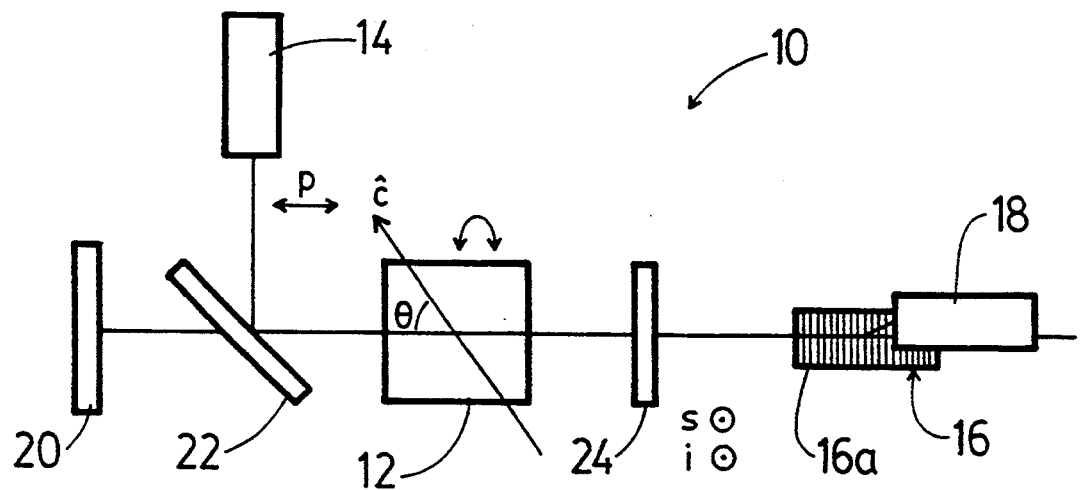
FIG._1.
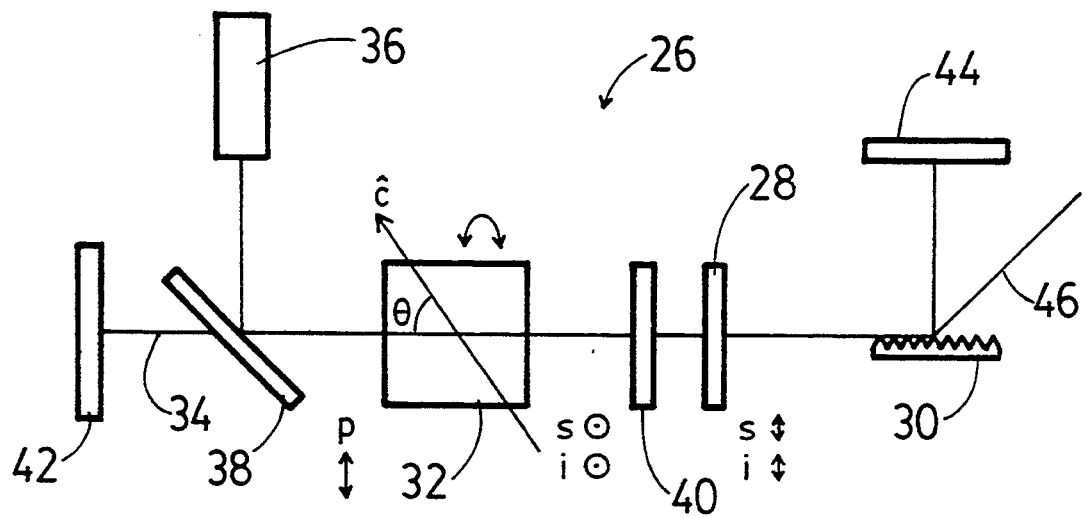
FIG._2.

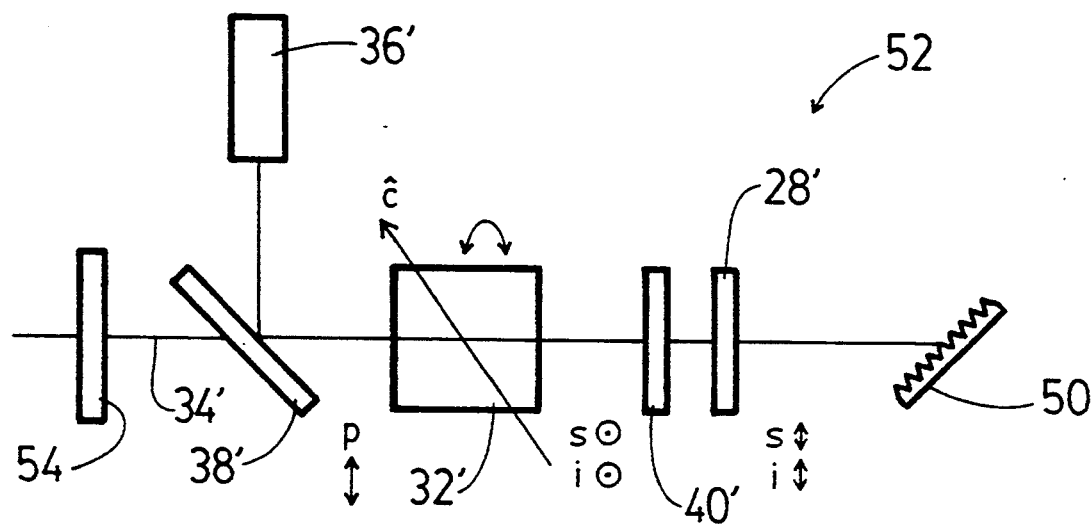
FIG._3.
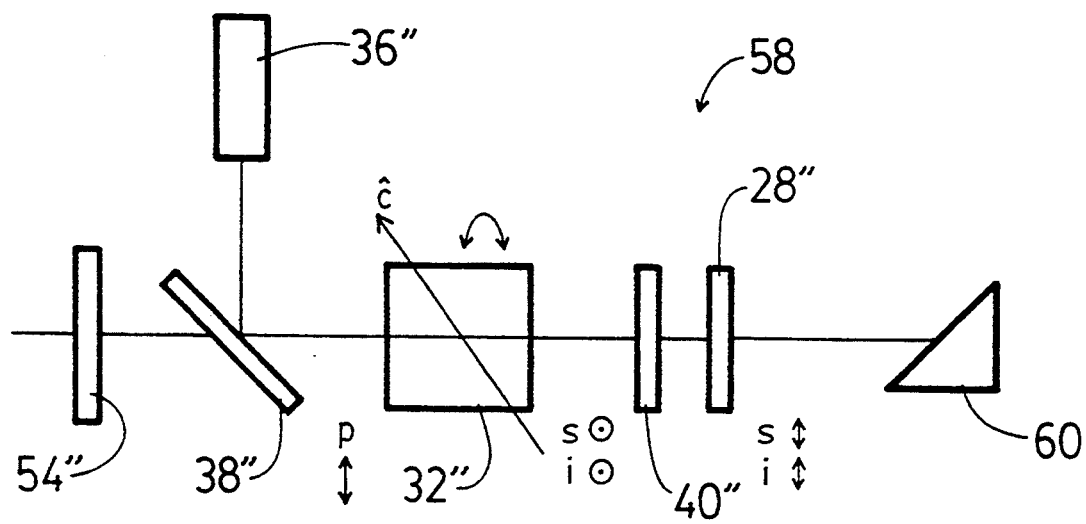
FIG._4.
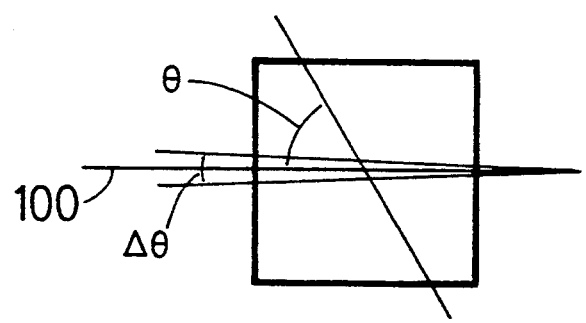
FIG._5.

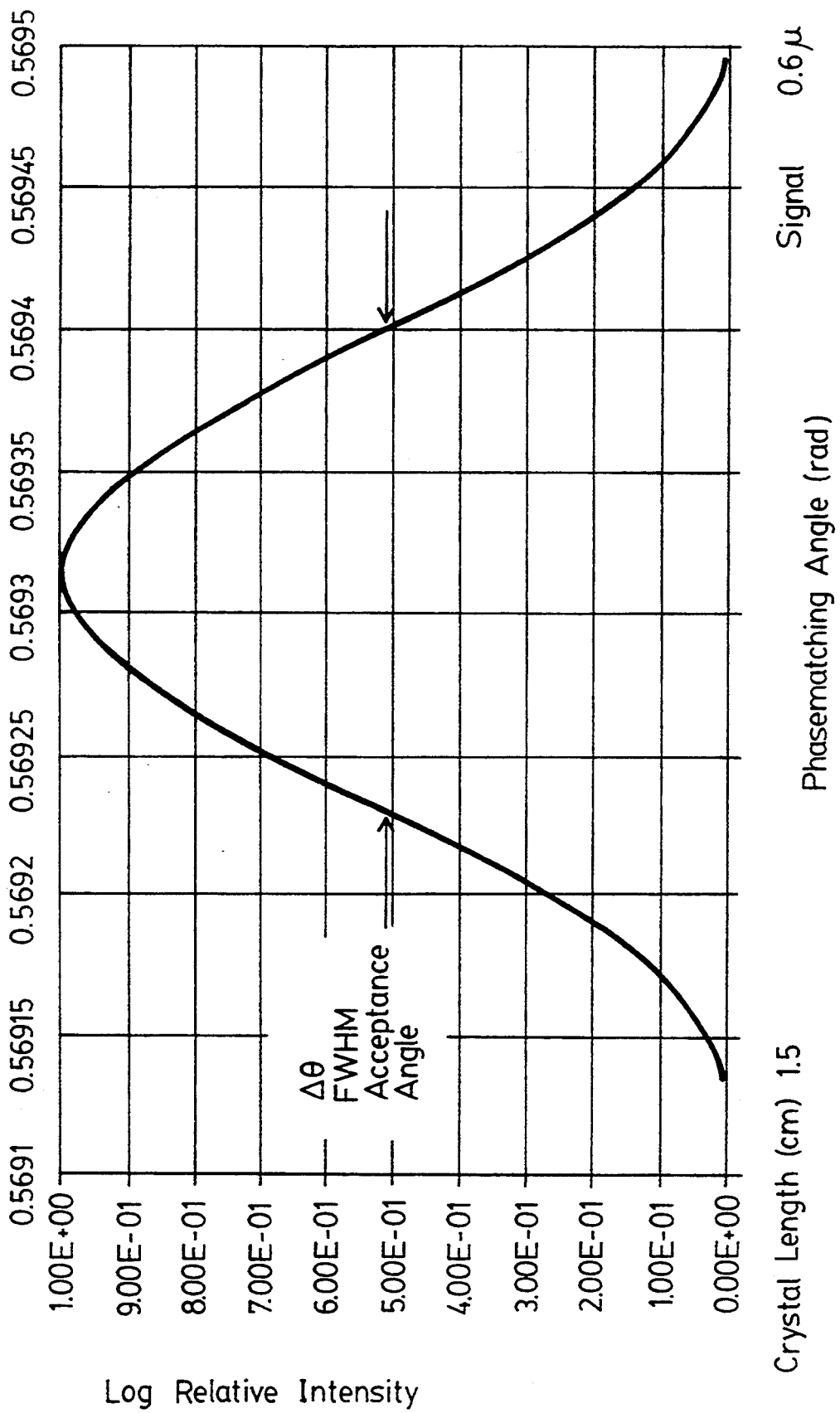
FIG._6.

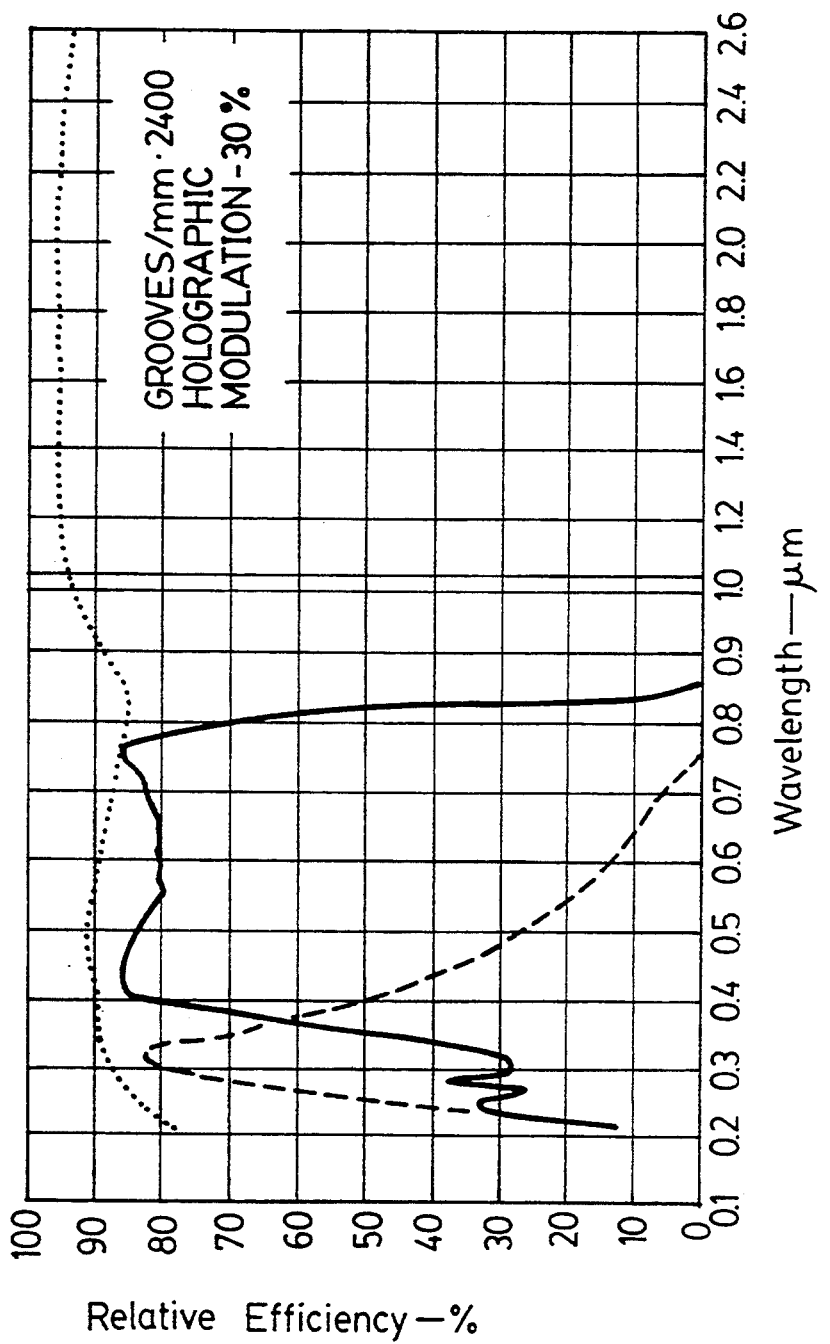

NARROW LINEWIDTH BBO OPTICAL PARAMETRIC OSCILLATOR UTILIZING EXTRAORDINARY RESONANCE

BACKGROUND OF THE INVENTION

This invention relates to optical parametric oscillators (OPOs). Optical parametric oscillators use non-linear crystals in order to tune an output over a range of frequencies. The non-linear crystals are placed within a resonator and driven by an intense pump radiation to generate tunable monochromatic light. OPOs use a three-wave process in which the high-frequency pump $\omega_p$ is decomposed into a signal wave $\omega_s$ and an idler wave $\omega_i$. The relationship of the pump, signal, and idler is governed by the conservation of energy and momentum. Energy conservation requires that the sum of the generated energies, and therefore frequencies, equal that of the pump. $\omega_p = \omega_s + \omega_i$. Momentum conservation is shown by the phase-making relationship $k_p = k_x + k_i$. The values $k_p$, $k_s$, and $k_i$ are the momentum vectors for the pump, signal, and idler, respectively, and are related by the wavelength $\lambda$ of each wave by the relation $k = 2\pi n/\lambda$, where n is the index of refraction.

In uniaxial birefringent crystals such as $\beta$-BaB$_2$O$_4$ (BBO), the index can either be ordinary or extraordinary ($n_o$ or $n_e$). If ordinary, the polarization vector of the light beam within the crystal is orthogonal to the optic axis of the crystal. In this plane, there is no angular relationship to the index. If extraordinary, the polarization vector of the light beam is in the plane of the optic axis, and therefore there is an angular relationship for the index. Momentum matching is achieved by rotating the crystal in the extraordinary plane, thereby varying the index and its associated k vector, of one of the light waves.

In many applications, it is desired that the output of the optical parametric oscillator have a narrow linewidth. Applications in spectroscopy and photochemistry may require linewidths of less than 0.1 cm$^{-1}$. Additionally, it is important that the optical parametric oscillator be efficient. This is especially true since some non-linear crystals such as BBO are typically pumped close to their damage threshold.

SUMMARY OF THE INVENTION

Gratings can be used to tune a beam such as the signal or idler which is fed back in the optical parametric oscillator. Angular variations of this beam translate into wavelength variations in the feedback signal because of the grating dispersion.

Some non-linear crystals, such as BBO cut for type I interaction, have a narrow acceptance angle in the extraordinary axis. In type I interactions, the pump beam is an extraordinary wave, and the signal and idler beams are ordinary waves. The non-linear crystal is oriented so that there is an angle $\theta$ between the optic axis of the non-linear crystal and direction of propagation of the extraordinary beam so that the parametric amplification of the desired signal occurs. This angle $\theta$ is determined by the phase matching requirements of the crystal. The acceptance angle is the angular range about this angle $\theta$ for which a diverging laser beam will interact.

The present invention involves placing the dispersion plane of the grating in the extraordinary plane defined by the non-linear crystal so as to use the narrow acceptance angle of the non-linear crystal to help narrow the linewidth of the output.

For type I interactions, an extraordinary pump beam produces ordinary signal and idler beams. In this configuration, it would not be obvious to arrange the grating such that its dispersion plane is in the extraordinary plane of the crystal. The grating has its greatest efficiency if the grating lines are perpendicular to the ordinary polarized signal beam. This causes the dispersion plane of the grating to be orthogonal to the extraordinary plane of the crystal.

For a type I interaction in the non-linear crystal, an embodiment of the present invention involves rotating the polarization of the signal beam from the ordinary to the extraordinary plane so that the grating has a high efficiency when it is aligned with its dispersion plane in the extraordinary plane defined by the non-linear crystal. In this manner, the grating is arranged with its grating lines orthogonal to the extraordinary plane so that the polarization of the ordinary product beam is perpendicular to the grating lines of the grating. The narrow acceptance angle of the extraordinary pump beam in the extraordinary plane of the non-linear crystal prevents pump waves having an angular component in the extraordinary plane outside of the acceptance angle from decomposing into signal and idler photons. For this reason, the angular variations in the extraordinary plane about the cavity axis of the OPO of the product beam is reduced. The gratings convert this reduced angular variation into a reduced linewidth of the product beam. In effect, the rotation of the product beam and orientation of the grating allows the angular filter effect of crystal to translate into a narrower linewidth.

Benefits can be obtained to a lesser extent by rotating the product beam away from the ordinary polarization, but not completely into the extraordinary plane when the grating lines are orthogonal to the extraordinary plane of the crystal. This partial rotation allows the product beam to be more perpendicular with respect to the grating lines than parallel. The optical element used to rotate the polarization of the ordinary beam may cause a rotation which depends upon the wavelength of the ordinary signal beam. Since the ordinary signal beam can be tuned by the optical parametric oscillator, the polarization of the ordinary signal beam may not be completely into the extraordinary plane defined by the non-linear crystal.

The present system has benefits over the use of beam-expanding prisms in the optical parametric oscillator. In lasers, prism beam expanders have been used to obtain a narrow linewidth. The prism beam expander causes losses, however. Lasers can overcome this loss by being pumped harder. In optical parametric oscillators, some crystals, such as BBO crystals, are pumped close to their damage threshold. This means that any losses caused by the prism beam expanders will have to be offset by an increase in pump energy, thereby increasing the propensity for crystal damage.

BRIEF DESCRIPTION OF THE DRAWINGS

The above and other features and aspects of the present invention will become more apparent upon reading of the following detailed description in conjunction with the accompanying drawings, in which:

FIG. 1 is a diagrammatic view of an optical parametric oscillator without a rotator;

FIG. 2 is a diagrammatic view of an optical parametric oscillator with a rotator and diffraction grating;

FIG. 3 is a diagrammatic view of an optical parametric oscillator with a rotator and Littrow-mounted grating;

FIG. 4 is a diagrammatic view of an optical parametric oscillator with a rotator and Littrow prism;

FIG. 5 is a diagram illustrating the acceptance angle;

FIG. 6 is a graph showing the efficiency of the interaction versus the angle from the optic axis of the non-linear crystal to illustrate the acceptance angle; and FIG. 7 is a graph showing the grating efficiency versus wavelength for different polarizations.

Similar elements among the different figures are labeled the same.

DETAILED DESCRIPTION OF THE PREFERRED EMBODIMENT

FIG. 1 is a diagrammatic view of an optical parametric oscillator 10 without a rotator. This optical parametric oscillator 10 has a non-linear crystal 12. For a type I interaction (eoo) in the optical parametric oscillator, the pump beam for the pump source 14 is polarized in the extraordinary plane of the non-linear crystal 12. The extraordinary plane of the non-linear crystal 12 is a plane of rotation of the optic axis c of the non-linear crystal 12, when the non-linear crystal 12 is rotated to be tuned at different angles. The signal and idler beams produced in the non-linear crystal 12 both have ordinary polarization so their polarization is orthogonal to the extraordinary plane of the crystal 12.

As shown in FIG. 1, the extraordinary plane of the crystal 12 is shown as a uniaxial crystal in which the index can be either ordinary or extraordinary. For the ordinary polarized beams, the signal and the idler, there is no angular relation to the index because the polarization of the light beam inside the crystal is orthogonal to the optic axis c of the crystal 12.

Rotating the crystal 12 in the extraordinary plane changes the angle $\theta$ between the direction of the propagation of the beams in the optical cavity and the optic axis c. Since in this situation the pump beam is polarized in the extraordinary plane, varying the angle $\theta$ varies the index $n_e$ and therefore varies the phase matching relationship, $k_p = k_x + k_i$.

The optical parametric oscillator 10 also uses a grating 16 and tuning mirror 18 to feed back a beam into the crystal 12. In the preferred embodiment, the signal beam is fed back into the crystal 12. By rotating the tuning mirror 18, the first order reflections off the grating 16 can be sent back along the axis of the optical parametric oscillator 10. The tuning mirror 18 and the rear mirror 20 define the cavity of the optical parametric oscillator 10. A signal beam will reflect between these two mirrors to seed the parametric interaction in the non-linear crystal 12. The non-linear crystal 12 and the tuning mirror 18 are both tuned in a manner that the desired signal beam resonates in the OPO 10. Zero order reflections off the grating 16 provide the output of the OPO 10.

The dispersion plane of the grating 16 is orthogonal to the extraordinary plane of the non-linear crystal 12. This orientation is used because the signal beam is polarized orthogonal to the extraordinary plane of the crystal. As shown in FIG. 7, for the relevant signal wavelengths, the range of around 450–750 nm, the grating is much more efficient if the input beam has its polarization perpendicular to the grating lines 16a of the grating 16. If the grating 16 is arranged with its grating lines perpendicular to the ordinary polarization of the signal beam, the dispersion plane is orthogonal to the extraordinary plane of the non-linear crystal 12.

The tuning mirror 18 is actually placed substantially on top of the grating 16. As shown in FIG. 1, the pump from the pump source 14 is sent through the non-linear crystal in two passes. The mirrors 22 and 24 are reflective for the pump beam wavelengths, and transmissive for the signal wavelengths. The pump beam reflects off the mirror 22 through the non-linear crystal 12 to the mirror 24 and then returns through the non-linear crystal and mirror 22 out back to the pump source 14. The signal beam passes through both mirrors 22 and 24 so that the signal beam resonates in the cavity formed between mirror 20 and tuning mirror 18.

The linewidth of the signal beam can be determined with a model similar to the model given by Brosnan and Byer in their paper "Optical Parametric Oscillator Threshold and Linewidth Studies," *IEEE Journal of Quantum Electronics*; Vol.QE-15, No. 6; June 1979; pp. 415–431, which is incorporated herein by reference. This model assumes that for the grating oscillator two mechanisms affect the linewidth: signal beam diffraction; and pump beam aperture. The diffraction term is dominated by the resonated spot size of the signal, while the aperture term is related to the pump beam spot size.

The intrinsic linewidth of the OPO crystal $\Delta v_c$ is only important when it is the same order of magnitude as the grating linewidth. The crystal linewidth is usually a few orders of magnitude broader than the grating linewidth, so that the relation $$\Delta v_{opo} = \sqrt{\frac{1}{\left(\frac{1}{\Delta v_c}\right)^2 + \left(\frac{1}{\Delta v_G}\right)^2}}$$

simply reduces to $$\Delta v_{opo} = \Delta v_G$$

The grating linewidth is the sum of the diffraction and aperture terms $$\Delta v_G = \Delta v_D + \Delta v_A$$

The diffraction limited linewidth is derived from considering the spot size of signal and the propagation of the beam inside a resonator of length L. There is a resulting diffraction limited angle which, in conjunction with the grating resolution, determines this linewidth term. The diffraction linewidth is given as $$\Delta v_D = (2\ln 2)^{\frac{1}{2}} \left[\frac{\cos\alpha}{\sin\alpha + \sin\beta}\right] \left[\frac{4L\lambda_s}{\pi w_s^2}\right]^{\frac{1}{2}} \left[\frac{1}{r\pi M w_s}\right]$$

where the terms are defined:

$\alpha, \beta$ angles of grating incidence and diffraction
r = grating reflections per round trip
M = linear magnification
L = cavity length
$\lambda_s$ = signal wavelength
$w_s$ = resonated spot size.

The resonated signal spot size evolves during the buildup time of the OPO. Its final steady state value is that of the pump. However, during the formation of the signal, it is significantly smaller than the pump size $w_p$, and is given by a cubic equation $$\left(\frac{\pi}{2L\lambda_s}\right)w_s^6 + w_s^2 - \frac{w_p^2}{2} = 0$$

The diffraction limited linewidth is determined by this spot size, which sets the diffraction angle of the system during the formation of the pulse. For a pump waist of 1.0 mm and a cavity length of 15 cm, the resonated spot size at 600 nm is 0.31 mm.

The diffraction angle assumes a steady state value early in the formation of a signal beam. The diffraction limited angle for a guassian beam is $$\Delta\alpha_D = \frac{1}{r}\left[\frac{4L\lambda_s}{\pi w_s^2}\right]^{\frac{1}{2}} \frac{\lambda_s}{\pi M w_s}$$

Using multiple gratings or a grazing incidence design reduces the diffraction angle by the number of grating reflections per cavity transit. The factor r accounts for this. r is 1 for a Littrow grating, 2 for grazing incidence, or 3 for dual grating. The beam expander reduces the diffraction angle by the linear magnification. For a brewster angle prism, the linear magnification is given as $M=n$, where n is the angle of diffraction. For N prisms, $M=M^N$. The resolution of the grating in grazing incidence is given as:

$$\frac{\Delta\lambda_s}{\lambda_s} = \frac{\Delta\alpha\cos\alpha}{\sin\alpha + \sin\beta}$$

The diffraction linewidth expression is then $$\Delta\nu_D = (2\ln2)^{\frac{1}{2}}\left(\frac{1}{\lambda_s}\right)\left[\frac{\cos\alpha}{\sin\alpha + \sin\beta}\right][\Delta\alpha_D]$$

The factor $(2\ln2)^{\frac{1}{2}}$ in the linewidth expression sets the $1/e^2$ value to a full width at half-maximum (FWHM) linewidth. For a pump waist of 1 mm, a corresponding resonated signal spot size of 0.31 mm and no beam expansion, the diffraction angle at 600 nm is 330 microradians. This yields a diffraction linewidth of 0.12 cm$^{-1}$ when a 2400 line/mm grating at 88.4° is utilized in a cavity 15 cm long.

The aperture linewidth comes from considering the pump waist and a ray geometry inside the cavity. Off-axis wavelengths are amplified in the gain medium and tend to broaden the linewidth. The aperture linewidth expression is $$\Delta\nu_A = (2\ln2)^{\frac{1}{2}}\frac{2aw_p\cos\alpha}{p(p+1)D\lambda_s^2 M}$$

wherein the terms are defined as
  $\alpha$ = grating angle of incidence
  $w_p$ = pump beam spot size
  a = groove spacing
  p = number of passes
  D = effective cavity length.

The angle over which the pump beam will amplify off-axis grating reflections is determined from the cavity geometry. The length D of the cavity is an effective length. This effective length is the length of an open cavity which would have the same ray path as a cavity with higher index materials such as beamsplitters, a crystal and a beam expander.

The grating on each pass reflects the off-axis radiation out of the amplifying region. The number of passes is assumed to be the number of cavity transits during the pump duration $\tau$ multiplied by the number of grating reflections $$p = \frac{rc\tau}{2L}$$

Again, we use the coefficient r to account for the case of two reflections per pass in a grazing incidence design, and three reflections per pass in a dual grating system. The summation of all the passes through the aperture $w_p$ is $(P+1)P/2$. The net effect of the multiple passes on the grating is a reduction of the aperture angle. A prism beam expander will also reduce the aperture angle by the magnification M. The aperture angle is given as $$\Delta\alpha_A = \frac{2w_p}{DM(p+1)p}$$

For a grazing incidence oscillator with the effective length of 14 cm, ten grating passes, no beam expansion, and a 1 mm pump waist, the aperture angle is 130 microradians.

The grating operating in the first order has a dispersion relation $$\frac{\Delta\lambda}{\Delta\alpha} = a\cos\alpha$$

Therefore, the aperture linewidth is $$\Delta\nu_A = \frac{\Delta\lambda}{\lambda^2} = (2\ln2)^{\frac{1}{2}}\frac{1}{\lambda^2}[2a\cos\alpha]\frac{w_p}{DM}\frac{1}{p(p+1)}$$

For the example system mentioned above, the aperture linewidth is 0.05 cm$^{-1}$ at 600 nm. This gives a fairly typical total linewidth value of 0.17 cm$^{-1}$ for a grazing incidence grating optical parametric oscillator using ordinary signal resonance. In ordinary signal resonance, the beam has a polarization orthogonal to the extraordinary plane, and the dispersion plane of the grating is orthogonal to the extraordinary plane of the non-linear crystal 12.

A summary of the laboratory results is given in Table 1. Examples 1-3 give the laboratory results for the ordinary resonance case. Looking at Example 1, we see that the typical measured linewidth at 543 nm is on the order of 0.25 cm$^{-1}$ for a grazing incidence single grating system with no expansion elements. The model predicts 0.24 cm$^{-1}$ linewidth. By expanding the intracavity beam with prisms, we can reduce the measured linewidth, as shown in Example 2, to 0.07 cm$^{-1}$. Here, the grating angle has to be reduced to 84.75° to overcome the losses of the prism beam expander.

We also used a second Littrow grating in conjunction with the beam expander to narrow the linewidth. In this case, Example 3, we had to reduce the angle of grating incidence to 82.6° to increase the diffraction efficiency, because the Littrow grating adds a loss. The result is nearly the same as the single grating/expander case. The measured linewidth is 0.07 cm$^{-1}$, but the threshold is about 70 mJ as opposed to 40 mJ for the grating-only case of Example 1.

The reduction of the aperture and diffraction angles and the increasing of the grating dispersion are keys to achieving the narrow linewidth, but the losses imposed by the expanders and the dual gratings requires an increased pump energy beyond the safe operating limits of the non-linear crystal.

Achieving less than 0.1 cm$^{-1}$ linewidth in a low-loss resonator with only a single diffraction grating and no beam expander is possible by resonating the signal radiation in the extraordinary crystal plane. FIG. 2 is a diagrammatic view of an optical parametric oscillator 26 with a rotator 28 and diffraction grating 30. The non-linear crystal 32 is cut for the type I interaction where an extraordinary pump is converted to an ordinary signal and idler beams. This means that the polarization of the pump coming into the non-linear crystal 32 is in the extraordinary plane, and the polarization of the signal in the idler beams produced have an ordinary polarization. The ordinary polarization has a polarization vector which is orthogonal to the extraordinary plane defined in the non-linear crystal 32.

The rotator 28 rotates the polarization of the signal and idler beams such that preferably the polarization of the signal beam is rotated into the extraordinary plane. The diffraction grating 30 is arranged such that its dispersion plane is in the extraordinary plane defined by the crystal 32. The grating 30 has grating lines perpendicular to the extraordinary plane of the non-linear crystal. This means that the rotated polarization of the signal and idler beams are perpendicular to the grating lines of the grating 30. For this reason, the grating 30 will have a high efficiency.

FIG. 7 shows the grating efficiency versus wavelength for different polarization orientations of a 2400 lines/mm holographic grating. As shown, the perpendicular polarization has a high efficiency in the range of about 450 nm to 750 nm. By rotating the polarization of the signal beam, the high efficiency perpendicular orientation with respect to the grating lines can be used at the same time that the dispersion plane of the grating is in the extraordinary plane defined by the crystal 32.

Alternate embodiments for the optical element 28 which is used to rotate the polarization of the signal beams could be a zero order half-wave plate, a 90° polarization rotator, or a quartz beam rotator.

As described below, a non-linear crystal 32 with a narrow acceptance angle, such as a BBO crystal cut for type I interactions, reduces the angular aperture for parametric gain in the extraordinary plane. This reduction of angular aperture acts an angular filter which reduces the angular variation about the cavity axis in the extraordinary plane at the grating 30 and thus reduces the wavelength variation of the signal beam as it is fed back in the optical parametric oscillator.

FIG. 5 is a diagram which illustrates the acceptance angle concept. This diagram is shown in the extraordinary plane of the crystal. The cavity axis 100 of the OPO forms an angle $\theta$ with the optical axis c of the non-linear crystal. Both the cavity axis 100 and optic axis c are in the extraordinary plane of the non-linear crystal. Assuming that the non-linear crystal is tuned so that the angle $\theta$ is a phase-matching angle for the desired signal beam, an extraordinary pump beam will have a finite acceptance angle $\Delta\theta$.

FIG. 6 is a graph showing an illustration of the acceptance angle concept. This curve shows the phase synchronism relation $$\frac{\left(\sin\left(\frac{\Delta k L}{2}\right)\right)^2}{\left(\frac{\Delta k L}{2}\right)^2}$$

which is the measure of the phase mismatch $\Delta k$ for a crystal of length L. The angular bandwidth (acceptance angle) is that angle defined by the full width at half maximum (FWHM) of the phase synchronism expression.

The phase matching criteria is given as $k_p = k_s + k_i$. The phase mismatch is a perturbation of the exact phase-matching and can be denoted as $k_p = k_s + k_i + \Delta k$. The FWHM of the phase synchronism expressed for a crystal of length L can be converted into an angle by realizing that $\Delta k$ can be expressed in terms of index change for the pump and consequently an angular change for the pump beam.

The phase synchronism curve depicts the actual interaction strength of the parametric process or the parametric gain as a function of angle. The crystal in the extraordinary plane will aperture the pump beam by limiting its efficiency in the process to the angle. In the ordinary plane, this synchronism expression is not valid and the pump can provide parametric gain to signals within the entire divergence angle of the pump which can be much larger than the acceptance angle.

In FIG. 2, the grating dispersion plane is operating in the critical phase-matching, or extraordinary, plane of the crystal. As discussed above, the crystal acceptance angle must be taken into account when configuring the system in this orientation. BBO, it should be noted, has a smaller acceptance angle than most other types of crystals. We can calculate the single-pass acceptance angle for a type I crystal of length L:

$$\Delta\theta_c = 0.886 \lambda_p \frac{1 + \left(\frac{n_{op}}{n_{ep}}\right)^2 \tan^2\theta}{L \tan\theta \left[1 - \left(\frac{n_{op}}{n_{ep}}\right)^2\right] n_{ep}(\theta)}$$

where
$n_{op}$ = ordinary index of pump
$n_{ep}$ = extraordinary index of pump
$\theta$ = phase-matching angle of crystal
$\lambda_p$ = pump wavelength
$n_{ep}(\theta)$ = the extraordinary index as a function of $\theta$.

For a 15 mm BBO crystal for type I interaction pumped at 355 nm, this single-pass acceptance angle is 175 microradians. If we double-pass the pump, as shown in FIG. 2, the angle is reduced to 88 microradians, significantly smaller than the diffraction and aperture terms calculated above.

The crystal serves the function of an angular, as well as spectral, filter. First, only wavelengths within the intrinsic crystal spectral bandwidth will be amplified. Second, the signal waves propagating outside of the acceptance angle will not be amplified, even though they fall within the spectral bandwidth. This is not the case in the ordinary plane, where the pump k vector will match diverging signal k vectors.

In the non-critical or ordinary plane, the pump k vector does not change with angle. Therefore, the off-axis components of the signal radiation within the spectral bandwidth of the device can be amplified if there is any corresponding pump component in the same cone angle. Since the pump beam is slightly divergent, there are off-axis pump components available to amplify the signal. In the extraordinary plane, the pump beam k vector is dependent on the angle; thus off-axis colors will not be amplified outside of a finite acceptance angle shown in FIG. 6.

Looking again at FIG. 2, the grating 30 works in conjunction with the crystal 32. The diffraction of light from the grating 30 caused by the narrow ruling lines on the grating surface disperses the light in only one plane. This is the plane in which the light is sent back along the resonator optical axis 34. Since the amplified light cone angle is reduced significantly in the extraordinary plane, and the grating dispersion is aligned in this plane, the resultant linewidth is narrower with the extraordinary resonance.

Returning to the equations for $\Delta \nu_d$ and $\Delta \nu_A$, we see that the model calculated the diffraction linewidth based upon the steady state diffraction angle and aperture linewidth based upon the reflection from the grating of off-axis rays into the gain volume. What we have done to the model, in the case of the extraordinary resonance, is to convolute the two angular bandwidths for the aperture and diffraction with the crystal acceptance angle bandwidth:

$$\Delta \alpha_{DE} = \left( \frac{1}{\Delta \alpha_D^2} + \frac{1}{\Delta \theta_c^2} \right)^{-\frac{1}{2}}$$

$$\Delta \alpha_{AE} = \left( \frac{1}{\Delta \alpha_A^2} + \frac{1}{\Delta \theta_c^2} \right)^{-\frac{1}{2}}$$

These modifications to the model yield a narrow acceptance angle when the crystal term is sufficiently smaller than the cavity term, but allow the cavity terms to dominate in the cases of beam expanders and dual gratings. If we now look at the examples of Table 1, we see that the measured reduction in linewidth due to the extraordinary resonance correlates favorably with the model. In Example 4, we used a 5° non-collinear pump geometry. The pump beam waist was 1.5 mm, and the grating angle was 87.8°. At 600 nm, the measured linewidth was 0.07 cm$^{-1}$, and the calculated linewidth was 0.08 cm$^{-1}$. If we had used ordinary resonance, the linewidth would measure 0.22 cm$^{-1}$. Examples 5–8 in Table 1 are laboratory data from 480–700 nm, using a 1 mm pump waist and grating angle of 88.5°. As can be seen, a significant linewidth reduction occurs for the extraordinary resonance, and the measured values correlate favorably to the calculated ones.

The present invention can also be used for type II interaction (eoe interaction) wherein the feedback beam is the ordinary polarized beam. The BBO cut for type II interaction does not have quite as narrow an acceptance angle, so the linewidth narrowing benefits would not be as great.

Looking again at FIG. 2, the OPO 26 has a pump source 36 that preferably provides a 355 nm pump radiation directed into the non-linear crystal 32 by the 45° turning mirror 38, which is a high reflector for the 355 nm pump radiation and a high transmitter for the 450–750 nm signal radiation. The non-linear crystal 32 is rotated by an angle $\theta$ from the optic or c axis of the crystal 32 to the cavity axis 34 of the OPO 26. The plane of rotation of the crystal 32 is referred to as the extraordinary crystal plane of the non-linear crystal 32. Rotating the non-linear crystal 32 in the extraordinary plane does not affect the index seen by ordinary waves, which have their polarization orthogonal to the extraordinary plane.

Mirror 40 is a zero degree dichroic that retro-reflects the pump radiation and transmits the signal radiation. The pump beam creates parametric fluorescence in the crystal 32 and successively amplifies the resonated signal in this crystal during the pump pulse duration. The resultant signal is resonated between the rear cavity mirror 42 and the tuning mirror 44, both of which are broad band high reflectors from 450–750 nm.

The signal is filtered spectrally twice on each pass by the first order reflection from the grating 30. This grating 30 serves to output couple the signal radiation from the zero order reflection along 46. A preferred grating ruling density for narrow linewidth is 2400 lines/mm and the preferred angle of incidence is 88.5°. In the preferred embodiment, the optical element 28 is a zero order wave plate inserted between the grating 30 and the pump retro-reflector 40. This waveplate 28 rotates by 90° the signal polarization vector from the ordinary crystal plane to the extraordinary plane of the crystal. The signal beam returning from the grating is rotated back into the ordinary plane by the waveplate 28.

In the preferred embodiment, the non-linear crystal is a uniaxial BBO crystal cut for type I interaction. The BBO crystal is available from Crystal Technology, Inc. located in Palo Alto, Calif. The dichroic mirrors, retro-reflectors, rear mirror, and zero order waveplate are available from CVI, located in Albuquerque, N. Mex. The grating is available from Instruments SA, Edison, N.J. The tuning mirror is available from Newport Corp. located in Fountain Valley, Calif. The pump laser is available from Continuum of Santa Clara, Calif., or Spectra Physics Lasers of Mountain View, Calif.

FIG. 3 is a diagrammatic view of an OPO with a rotator 28' and Littrow-mounted grating 50. This embodiment is similar to the embodiment shown in FIG. 2; however, a Littrow-mounted grating 50 returns a diffraction order back to the OPO 52 and a partially transmissive mirror 54 produces the output signal. In this case as well, the rotator 28' rotates the orientation of the signal beams from the polarization orthogonal to the extraordinary axis to a polarization in the extraordinary axis, so that the dispersion plane of the grating 50 is in the extraordinary plane of the non-linear crystal 32'. The grating lines of the Littrow-mounted grating 50 are orthogonal to the polarizations of the signal beam, so that the efficiency of the Littrow-mounted grating 50 is optimized. The linewidth of the OPO 52 with the Littrow-mounted grating is not as narrow as the linewidth of OPO 26 described in FIG. 2. However, looking again at FIG. 3, in this configuration, the narrow acceptance angle in the extraordinary crystal plane of the crystal 32' can be used to narrow the linewidth from the other orientation of the grating. The Littrow grating is available from Instruments SA, of Edison, N.J. The transmitting mirror is available from CVI of Albuquerque, N.Mex.

FIG. 4 is a diagrammatic view of an optical parametric oscillator with a rotator 28" and a Littrow prism 60. The Littrow prism 60 is another embodiment for returning a diffraction order of the signal beam into the OPO 58. The Littrow prism is available from CVI of Albuquerque, N.Mex.

Looking again at FIG. 2, the rotator 28 does not have to rotate the signal beam exactly 90° over the entire wavelength range of the signal wavelength. A zero order waveplate 28 can be set to rotate by 90° the polarization of a center wavelength (i.e. 600 nm) of a 450–750 nm signal output range. Signals with a wavelength at either end of the output range would not have exactly a 90° rotation, so the signal beam sent to the grating 30 would not necessarily be polarized in the extraordinary plane of the non-linear crystal 32. The polarization would have a relatively large component in this plane, however, so that the grating 30 could be somewhat efficient.

Additionally, it would be theoretically possible that the dispersion plane of the grating 30 be oriented at an orientation that is not orthogonal to the extraordinary plane of the crystal 32, yet not in the extraordinary plane. If the signal beam's polarization were rotated for the grating's optimum efficiency, the grating's orientation would allow a partial linewidth narrowing effect as a result of the narrow acceptance angle of the non-linear crystal 32 in the extraordinary plane. This partial effect is less than if the dispersion plane of the grating was coplanar with the extraordinary plane of the crystal 32.

Various details of the implementation and method are merely illustrative of the invention. It will be understood that various changes of details may be within the scope of the invention, which is to be limited only by the appended claims.

thogonal to the extraordinary plane of the non-linear crystal; and an optical element in the optical cavity adapted to rotate the polarization of the product beam from the ordinary polarization.

2. The optical parametric oscillator of claim 1, wherein the grating is aligned so that the dispersion plane of the grating is substantially coplanar with the extraordinary plane of the non-linear crystal.

3. The optical parametric oscillator of claim 2, wherein the optical element in the optical cavity is adapted to rotate the polarization vector of the product beam from the ordinary polarization to substantially the extraordinary crystal polarization plane.

4. The optical parametric oscillator of claim 1, wherein the optical element is a zero order half waveplate.

5. The optical parametric oscillator of claim 4, wherein the zero order half waveplate is a 90 degree polarization rotator over the signal tuning range.

6. The optical parametric oscillator of claim 1, wherein the optical element is a beam rotator.

7. The optical parametric oscillator of claim 1, wherein said product beam is the signal beam of the non-linear crystal.

8. The optical parametric oscillator of claim 1, wherein said product beam is the idler beam of the non-linear crystal.

9. The optical parametric oscillator of claim 1, wherein said grating is a diffraction grating and wherein said reflective elements comprise a rear mirror and a tuning mirror in the dispersion plane of the diffraction grating, said diffraction grating dispersing the product beams into different orders, one of the orders being an output and the tuning mirror arranged to reflect another of the orders back toward the non-linear crystal.

TABLE 1

| | Example 1 | Example 2 | Example 3 | Example 4 | Example 5 | Example 6 | Example 7 | Example 8 |
|---|---|---|---|---|---|---|---|---|
| Type | o wave | o wave | o wave | e wave | e wave | e wave | e wave | e wave |
| Grating | Single 2400 | Single 2400 | Dual 2400 | Single 2400 | Single 2400 | Single 2400 | Single 2400 | Single 2400 |
| Beam Expansion? | no | 6 prism | 6 prism | no | no | no | no | no |
| D (cm) | 14 | 20 | 20 | 14 | 14 | 14 | 14 | 14 |
| L (cm) | 15 | 30 | 30 | 15 | 15 | 15 | 15 | 15 |
| $\alpha$ | 88° | 84.75° | 82.6° | 87.80° | 88.4° | 88.4° | 88.4° | 88.4° |
| $\lambda$ (nm) | 543 | 594 | 594 | 601.00 | 480 | 500 | 600 | 700 |
| $w_p$ (cm) | 0.125 | 0.15 | 0.15 | 0.15 | 0.1 | 0.1 | 0.1 | 0.1 |
| $w_s$ (cm) | 0.034 | 0.048 | 0.048 | 0.038 | 0.031 | 0.031 | 0.031 | 0.031 |
| measured linewidth (cm$^{-1}$) | 0.25 | 0.07 | 0.07 | 0.07 | 0.08 | 0.08 | 0.08 | 0.04 |
| model o wave (cm$^{-1}$) | 0.24 | 0.08 | 0.06 | 0.22 | 0.28 | 0.21 | 0.17 | 0.15 |
| model e wave (cm$^{-1}$) | 0.09 | 0.07 | 0.06 | 0.08 | 0.09 | 0.09 | 0.06 | 0.04 |

What is claimed is:

1. An optical parametric oscillator comprising:
an optical cavity defined between two reflective elements;
a non-linear optical crystal having an extraordinary plane, said non-linear crystal located in the optical cavity and adapted to generate a product beam of ordinary polarization in response to a pump beam of extraordinary polarization, said product beam having a different wavelength from the pump beam;
a grating in said optical cavity, said grating aligned so that the dispersion plane of the grating is not or- 10. The optical parametric oscillator of claim 1, wherein the non-linear crystal is cut for the TYPE I interaction.

11. The optical parametric oscillator of claim 1, wherein the non-linear crystal has a narrow acceptance angle in the extraordinary plane.

12. The optical parametric oscillator of claim 11, wherein the non-linear crystal is a BBO crystal.

13. The optical parametric oscillator of claim 1, further comprising a mirror in said cavity that is a high transmitter of the pump beam and a high reflector of the product beam.

14. The optical parametric oscillator of claim 1, wherein the optical element is placed between the non-linear crystal and the grating.

15. The optical parametric oscillator of claim 1, wherein the grating has grating lines substantially orthogonal to the extraordinary plane.

16. An optical parametric oscillator comprising:
   a Littrow-mounted grating serving as a mirror and a partially transmitting mirror forming an optical cavity therebetween;
   a non-linear optical crystal having an extraordinary plane, said non-linear crystal located in the optical cavity and adapted to generate a product beam of ordinary polarization in response to a pump beam of extraordinary polarization, said product beam having a different wavelength from the pump beam; and
   an optical element in the optical cavity adapted to rotate the polarization of the product beam from the ordinary polarization, wherein the Littrow-mounted grating is aligned so that the dispersion plane of the grating is not orthogonal to the extraordinary plane of the non-linear crystal.

17. The optical parametric oscillator of claim 16, wherein the Littrow-mounted grating is aligned so that the dispersion plane of the grating is substantially co-planar with the extraordinary plane of the non-linear crystal.

18. The optical parametric oscillator of claim 17, wherein the optical element in the optical cavity is adapted to rotate the polarization vector of the product beam from the ordinary polarization to substantially the extraordinary crystal polarization plane.

19. The optical parametric oscillator of claim 16, wherein said Littrow-mounted grating is a Littrow prism.

20. The optical parametric oscillator of claim 16, wherein said Littrow-mounted grating disperses the product beams into different orders, and wherein the Littrow-mounted grating is arranged to feed back one of the orders to the non-linear crystal.

21. The optical parametric oscillator of claim 16, wherein the non-linear crystal is cut for the TYPE I interaction.

22. The optical parametric oscillator of claim 16, wherein the non-linear crystal has a narrow acceptance angle in the extraordinary plane.

23. The optical parametric oscillator of claim 22, wherein the non-linear crystal is a BBO crystal.

24. A method of forming a narrow linewidth beam with a non-linear crystal having an extraordinary plane comprising the steps of:
   amplifying in said non-linear crystal a beam such that an amplified light cone is substantially narrower in the extraordinary plane of the non-linear crystal, said beam having an ordinary polarization;
   rotating the polarization of the beam from the ordinary polarization; and
   dispersing said beam with a grating along a dispersion plane which is not orthogonal to the extraordinary plane of the non-linear crystal.

25. The method of claim 24, wherein said non-linear crystal has a narrow acceptance angle in the extraordinary plane and wherein said amplifying step comprises pumping the non-linear crystal with a pump beam of extraordinary polarization.

26. The method of claim 25, wherein the non-linear crystal is pumped with two passes of the pump beam.

27. The method of claim 24, further comprising feeding back a portion of the beam into the non-linear crystal.

28. The method of claim 27, further comprising rotating the polarization of the feedback beam into the ordinary polarization before the feedback beam re-enters the non-linear crystal.

29. The method of claim 24, wherein said dispersing step comprises dispersing along a dispersion plane substantially co-planar with the extraordinary plane of the non-linear crystal.

30. The method of claim 24, wherein said rotating step comprises rotating the polarization vector of the beam from the ordinary polarization to substantially the extraordinary crystal polarization plane.

31. A method of forming a narrow linewidth beam with a non-linear crystal having an extraordinary plane comprising the steps of:
   generating a beam of ordinary polarization in a non-linear optical crystal from a pump beam of extraordinary polarization, said beam having a different wavelength from the pump beam;
   dispersing said beam with a grating along a dispersion plane which is substantially co-planar to the extraordinary plane of the non-linear crystal; and
   returning a portion of the beam to the non-linear crystal.

32. The method of claim 31, further comprising rotating the polarization of the beam so that the beam has a polarization perpendicular to grooves of the grating.

* * * * *